: 2,885,078
Patented May 5, 1959

2,885,078
FLOTATION OF MICA FROM SILT DEPOSITS

Douglas H. Fenske, Lakeland, Fla., assignor to International Minerals & Chemical Corporation, a corporation of New York No Drawing. Application April 12, 1956
Serial No. 577,666

4 Claims. (Cl. 209—166)

This invention relates to a method of treating mica, and particularly to a method of treating mica recovered from silt deposits. More particularly, it relates to a method of concentration of river silt mica.

Mica in fine particle size form has been recovered from the beneficiation of kaolin and feldspar ores. Now it has been discovered that large quantities of mica are available in certain river beds and lake bottoms in the southeastern part of the United States. The mica is present in silt deposits in the form of small particles. It is necessary to separate this mica from sand, organic material and other gangue to obtain a commercially acceptable mica concentrate.

It is a primary object of this invention to provide a method for recovery of a high grade mica flotation product.

It is another object of this invention to provide an efficient method for removal of organic material so that a clean mica separation may be effected.

It is another object of this invention to provide a method of treating silt deposit mica which requires less reagent for mica flotation and give a cleaner product for the same recovery of floated mica.

These and other objects of this invention will be apparent to those skilled in the art from the following description.

The present invention is directed to a method in which mica particles found in silt deposits are separated from organic and gangue material by a series of flotation operations.

More in detail, the silt deposit is removed from the river bed or lake bottom by a dredge and transported to a processing plant. The material is wet screened at about 4 mesh to remove large pieces of foreign matter. A typical analysis of a silt deposit obtained from a lake bottom in the vicinity of Greeneville, Tennessee is as follows:

| Constituent | Percent By Weight | |
|---|---|---|
| | Silt As Mined | −4 +80 Mesh Feed |
| Micas | 10 | 66 |
| Quartz | 60 | 14 |
| Organic debris | 6 | 5 |
| Feldspar | 14 | 3 |
| Miscellaneous | 10 | 12 |

This material is further screened or sized at a predetermined point in the range between about 40 mesh and about 80 mesh to remove quartz, feldspar, heavy minerals and the like. Material recovered in the size range of, for example, −4 +48, is concentrated as to solids content in suitable thickening equipment such as a hydroseparator or bowl classifier.

The underflow material from the thickener being a slurry of generally between 20% and 35% solids content is conditioned with suitable hydrocarbons and frothers and a preliminary flotation to reduce organic matter is effected.

Suitable hydrocarbons for flotation of organic matter are gas oil, fuel oil, kerosene and the like. The hydrocarbons are used in quantities ranging from about 1 pound to about 3 pounds of hydrocarbon per ton of solids feed.

In conjunction with fuel oil, it is generally advantageous to use small quantities of frothers such as pine oil, cresylic acid, alcohols such as methyl-isobutyl carbinol, and the like. Quantities of frother used generally vary from about 0.1 pound to about 0.5 pound of frother per ton of feed.

After organic matter content is reduced by flotation using the above reagents in a Denver or Fagergren type flotation apparatus, the residue solids are further conditioned with reagents having a preferential affinity for mica over quartz cinders, chert, and the like. Preferably, the mica flotation is carried out utilizing cationic reagents, i.e., amine reagents such as tallow amines and floating in conjunction with small amounts of collectors and frothers together with proper amounts of acid for pH adjustment.

For this flotation, relatively small amounts of amine reagents are needed, varying from about 0.3 pound to about 1 pound per ton of solid feed. Amounts of fuel oil collector needed vary from about 0.3 pound to about 3 pounds per ton of feed. Frothers generally vary in amount from about 0.2 pound to about 0.6 pound per ton of feed.

This flotation produces a cleaner mica float with a higher recovery of mica from the feed at comparative reagent cost, as will be seen from the following examples.

Example I

Silt deposit material obtained from Davey Crockett Lake in the vicinity of Greeneville, Tennessee, was screened on 4 mesh and 40 mesh screens and the solids thickened to recover a flotation feed having the following analysis:

| Constituent: | Percent by weight |
|---|---|
| Mica | 70 |
| Sand (quartz, feldspar, cinders, etc.) | 23 |
| Organic debris | 7 |

This feed was split into two portions; A and B. Portion A of the feed was scrubbed at approximately 25% solids with water, deslimed and floated in a Denver laboratory cell with 2.7 #/T $H_2SO_4$, 0.33 #/T tallow amine, 0.33 #/T fuel oil, and 0.24 #/T methyl isobutyl carbinol.

The following results were obtained:

| | Concentrate, Percent | Middlings, Percent | Tail, Percent |
|---|---|---|---|
| Mica | 91 | 55 | 8 |
| Sand (quartz, feldspar, cinders, etc.) | 9 | 35 | 47 |
| Organic Debris | Trace | 10 | 45 |

Mica recovery in the concentrate amounted to 78% by weight of the mica in the feed.

Example II

Portion B of the feed was cell-conditioned at 10% solids content slurry with 2 pounds per ton of feed of kerosene and 0.3 pound per ton of methyl isobutyl carbinol, for one minute.

After flotation in a Denver type cell, the underflow analyzed as follows:

| | Percent by weight |
|---|---|
| Mica | 70 |
| Sand (quartz, feldspar, cinders, etc.) | 24 |
| Organic debris | 6 |

Underflow solids were next conditioned with 2.7 pounds sulfuric acid, 0.33 pound of tallow amine reagent, 0.33 pound fuel oil, and 0.24 pound of methyl isobutyl carbinol per ton of solids.

Flotation in the Denver flotation cell produced the following products:

| | Concentrate, Percent | Middlings, Percent | Tail, Percent |
|---|---|---|---|
| Mica | 94 | 38 | 8 |
| Sand (quartz, feldspar, cinders, etc.) | 6 | 56 | 52 |
| Organic Debris | Trace | 6 | 40 |

Percent of the mica recovered as concentrate amounted to 83% by weight of the mica in the feed.

From a comparison of the products of Examples I and II, it can be seen that the process of Example II recovered more mica in a product of higher purity at the same reagent consumption than can be recovered by the standard operating procedure of Example I.

Having thus described my invention, what I claim is:

1. A process for beneficiating mica found in silt deposits which comprises separating a fraction in which mica is present in substantial amount, said fraction having a particle size in the range between about 4 and about 80 mesh, subjecting the fraction to flotation with hydrocarbon and frothing agents, said hydrocarbon agent being selected from the group consisting of gas oil, fuel oil, and kerosene, subjecting the underflow product to cationic reagent flotation and recovering a mica concentrate as overflow product from the flotation apparatus.

2. A process for beneficiating mica found in silt deposits which comprises separating a fraction in which mica is present in substantial amount, said fraction having a particle size in the range between about 4 and about 80 mesh, subjecting the fraction to flotation with from about 1 pound to about 3 pounds of hydrocarbons and from about 0.1 pound to about 0.5 pound of frother per ton of feed, said hydrocarbons being selected from the group consisting of gas oil, fuel oil, and kerosene, subjecting the underflow product to cationic reagent flotation and recovering a mica concentrate as overflow product from the flotation apparatus.

3. A process for beneficiating mica found in silt deposits which comprises separating a fraction in which mica is present in substantial amount, said fraction having a particle size in the range between about 4 and about 80 mesh, subjecting the fraction to flotation with hydrocarbon and frothing agents, said hydrocarbon agent being selected from the group consisting of gas oil, fuel oil, and kerosene, subjecting the underflow product to flotation with amine flotation reagents and recovering a mica concentrate.

4. A process for beneficiating mica found in silt deposits which comprises separating a fraction in which mica is present in substantial amount, said fraction having a particle size in the range between about 4 and about 80 mesh, subjecting the fraction to flotation with hydrocarbon and frothing agents, said hydrocarbon agent being selected from the group consisting of gas oil, fuel oil, and kerosene, subjecting the underflow product to flotation with between about 0.3 pound and about 1 pound of tallow amine reagent, about 0.3 pound to about 3 pounds of fuel oil and between about 0.2 pound and about 0.6 pound of frother per ton of underflow product and recovering a mica concentrate.

References Cited in the file of this patent

UNITED STATES PATENTS

| | | |
|---|---|---|
| 2,132,902 | Lenher | Oct. 11, 1938 |
| 2,303,962 | Tartaron et al. | Dec. 1, 1942 |
| 2,409,665 | Cole | Oct. 22, 1946 |
| 2,792,940 | Baarson | May 21, 1957 |